Dec. 17, 1968 J. J. PARISER 3,417,374

COMPUTER-CONTROLLED DATA TRANSFERRING BUFFER

Filed Jan. 24, 1966 4 Sheets-Sheet 1

INVENTOR
JACK J. PARISER,
BY J. K. Haskell
ATTORNEY.

Dec. 17, 1968 J. J. PARISER 3,417,374

COMPUTER-CONTROLLED DATA TRANSFERRING BUFFER

Filed Jan. 24, 1966 4 Sheets-Sheet 2

COMPUTER-CONTROLLED DATA TRANSFERRING BUFFER

United States Patent Office 3,417,374
Patented Dec. 17, 1968

3,417,374

COMPUTER-CONTROLLED DATA TRANSFERRING BUFFER

Jack J. Pariser, Orange, Calif., assignor to Hughes Aircraft Company, Culver City, Calif., a corporation of Delaware Filed Jan. 24, 1966, Ser. No. 522,787
13 Claims. (Cl. 340—172.5)

ABSTRACT OF THE DISCLOSURE

A buffer, which operates with a minimum of equipment, including a scanner, whereby lines connecting the computer to a plurality of terminal devices are scanned to sense which of the input devices has data to be transferred to the compter and which of the output devices is to receive data from the computer. When the scanner stops in response to an input or output data signal, an address is generated and the byte is inserted into memory or applied to the output line. A portion of each word is used as a counter to provide control of the number of bytes transferred into or out of a stored word, thus providing message unpacking and packing.

This invention relates to compter circuitry and more particularly to circuitry for controlling the transfer of data between a computer and a plurality of terminal devices.

The problem of interconnecting a computer with a plurality of devices via data lines, which either supply data to the computer, or are energized to receive data therefrom, increases in complexity as the number of devices and the number of lines interconnecting each device increase. The problem is further complicated if the message formats or rates at which data is transferable to and from the various devices differ from one another. The data is generally in the form of a sequence of groups of bits, hereafter also referred to as bytes.

In the prior art, these problems have been overcome by providing a separate register and a separate byte counter for each set of lines, linking the computer with another terminal device. Fan-in and fan-out circuits are used to transfer data between each separate register and permanent memory. Such an arrangement requires a considerable amount of equipment which increases the complexity of operation thereof as well as the overall cost of the computer system in which it is incorporated. A need therefore exists for a relatively simpler arrangement whereby bytes may be transferred between a computer and a plurality of terminal devices.

Accordingly, it is a primary object of the present invention to provide a novel arrangement for coupling a computer to a plurality of terminal devices via linking data lines through which data is supplied to the computer or received therefrom.

Another object of the invention is the provision of a computer controlled buffer for transferring data between a computer and sets of linking data lines, interconnecting a plurality of terminal devices with the computer.

A further object is to provide a computer controlled data transferring buffer for transferring data or bytes between a plurality of data sources and the computer with partial packing and unpacking which requires a smaller amount of equipment than prior art arrangements.

Still a further object is the provision of a compter controlled data transferring buffer capable of transferring bytes of different lengths provided at different rates between a plurality of terminal devices and the computer, with less equipment than prior art arrangements.

Yet another object is to provide a data transferring buffer which includes essentially a single input-output (I/O) channel through which bytes of different lengths from a plurality of terminal devices at different rates are supplied to and from the computer.

These and other objects of the invention are achieved by providing a buffer, including a scanning arrangement whereby lines connecting the computer to a plurality of terminal devices are scanned to sense which of the devices is to be serviced, i.e., which of the input terminal devices has data to be transferred to the computer and which of the output terminal devices is to receive data from the computer. An input terminal device supplying data to the computer provides an input data signal which, when sensed, causes the scanner to stop at the lines linking the particular input device with the computer. The position at which the scanner stops is used by a computer address generator to generate an address in either the computer memory or a buffer memory of one of the words associated with the particular input device. The word stored at such address is transferred to a control register, and the data from the particular input device transferred through a fan-in network into the word in the control register. A portion of each word is used as a counter whose initial state is under the computer's control, the count therein being modified by the buffer each time data is inserted into the memory word. After the byte is inserted in the word, the word is restored to memory and the computer activates the scanner to scan succeeding link lines. During byte transfer the counter is monitored and when the memory word is filled, acording to the computer's directions, the counter provides the computer with a signal causing the computer program to prepare a new word with a new initial state number for the transfer of the next word length from the same input device. Thus message unpacking is automatically effected.

When an output terminal device is to receive a byte from the computer, an output data signal is provided which when sensed by the scanner causes it to stop at a position related to the particular output device. Thereafter the operation is similar to that of transferring a byte to the computer in that an address is generated as a function of the position at which the scanner stopped and a word association with the particular output device is transferred to the buffer control register. As the byte is read out therefrom, the count in the bit counter is modified. When the complete word is read out, a signal is supplied to the computer causing the computer program to prepare the next byte word to be supplied to the buffer control register when the next output data signal from the same output device is received. Thus message packing is automatically effected.

The novel computer controlled data transferring buffer of the present invention may be operated in either a serial or parallel mode as well as either synchronously or asynchronously. A basic requirement for satisfactory operation is that the period for servicing a terminal device whether in the input or output mode times the number of devices be not greater than the shortest bit period of any of the devices. Such time relationship is necessary to assure that data will not be lost during the transfer operation. The teachings of the present invention may find particular utility in coupling relatively slow terminal devices such as typewriters, card punched tape readers and punches, gyros, step motors, relays, etc., to a relatively much faster computer.

The novel features that are considered characteristic of this invention are set forth with particularity in the appended claims. The invention itself both as to its organization and method of operation, as well as additional objects and advantages thereof, will best be understood from the following description when read in connection with the accompanying drawings, in which:

Figure 1:
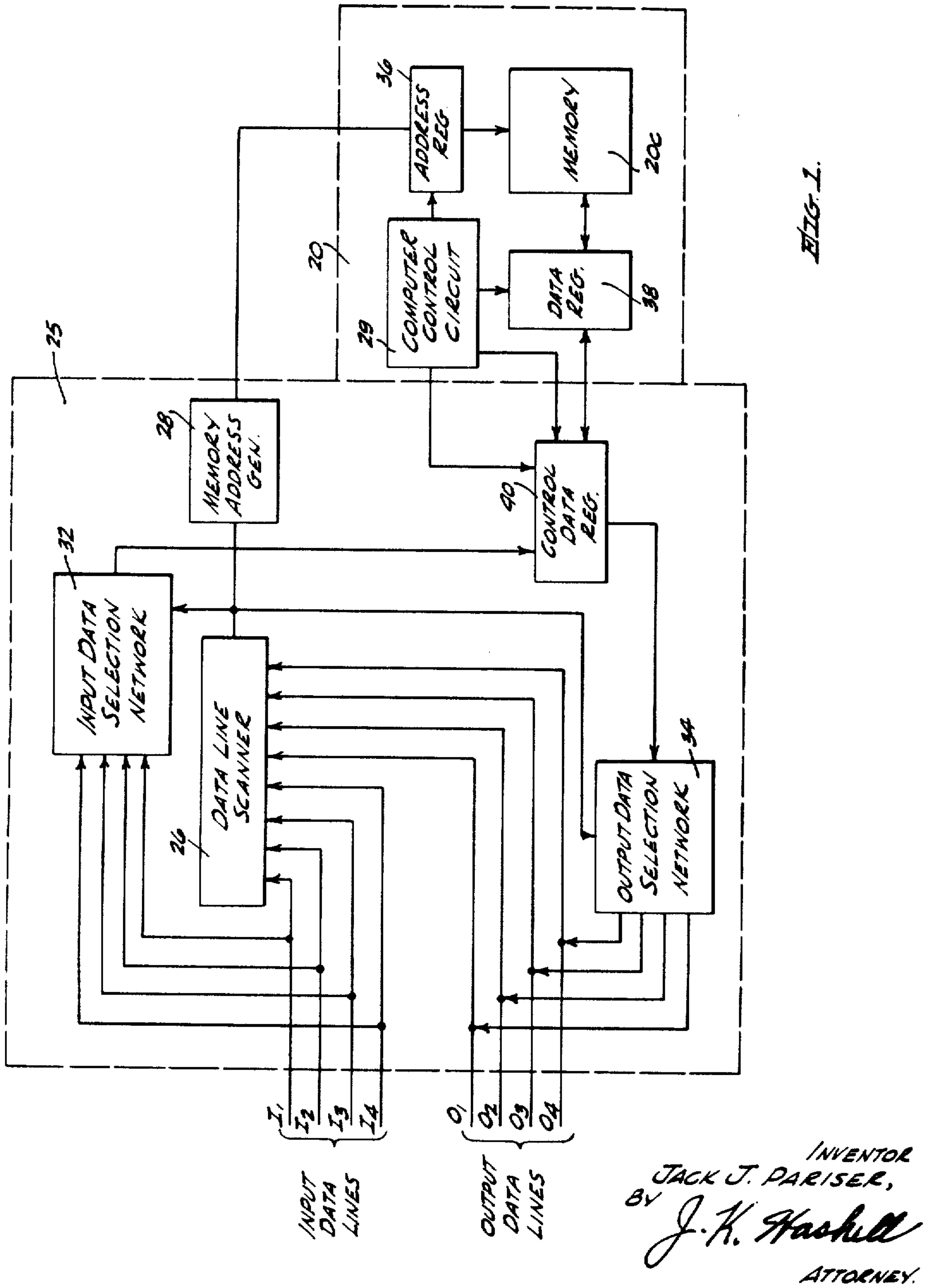
FIGURE 1 is a basic block diagram of the novel computer controlled data transfer buffer of the present invention.

Reference is now made to FIGURE 1 which is a simplified block diagram showing a typical computer 20 coupled to a plurality of input data lines, designated as $I_1$ through $I_4$, and a plurality of output data lines, designated as $O_1$ through $O_4$, through a computer controlled buffer 25. Each of the input data lines I, assumed to be connected to an input terminal device providing data to the computer, may in practice consist of one or more linking lines even though in the figure only a single line is shown. Similarly, each of the output data lines O assumed to be connected to an output terminal device may consist of one or more linking lines. Thus, hereafter, even though reference will be made to input and output data lines, it should be appreciated that such reference is assumed to include sets of input and output data lines, each set of one or more lines being connected to a terminal device.

For explanatory purposes only, the invention will be described hereafter in connection with a serial mode of operation whereby data from any of the input devices is supplied via a single linking line such as $I_1$ as a series of bits, transferring one bit per scan position. However, as will be appreciated from the following description, a plurality of linking lines from each input device may be utilized to transfer one byte per scan position to the computer. It should further be appreciated that even though in FIGURE 1 the number of input and output data lines has been limited to four each, any number of lines may be utilized, provided the number of lines N times the period required by the buffer and/or computer to service a line, hereafter designated as $P_C$, is not greater than the shortest bit period $P_L$ of any of the lines, which may be expressed as $P_C \times N \leq P_L$.

The buffer 25 includes a data line scanner 26, the function of which is to scan the input and output lines $I_1$ through $I_4$ and $O_1$ through $O_4$ to sense input or output data signals thereon, stop at a position related to the line providing such a signal, and supply a position indicating output to a memory address generator 28. The output is also supplied to an input data selection network 32 and output data selection network 34 which form a part of buffer 25. Network 32 is also connected to each of the input data lines, while output data selection network 34 is coupled to each one of the output data lines. The computer 20 may also include a memory unit 20C which in some cases may be outside the computer and address and data registers 36 and 38 respectively. Data register 38 of computer 20 is shown connected to a buffer control register 40 of buffer 25, the latter register being also connected to networks 32 and 34. Control register 40 and data register 38 may be incorporated in a single register unit.

The computer 20 and the units 20C, 29, 36 and 38 are well known in the art and may be of the type taught and described in chapter 9 of "Digital Computer Fundamentals," 1960, by Thomas C. Bartee and published by McGraw-Hill Book Co.

Figure 6:
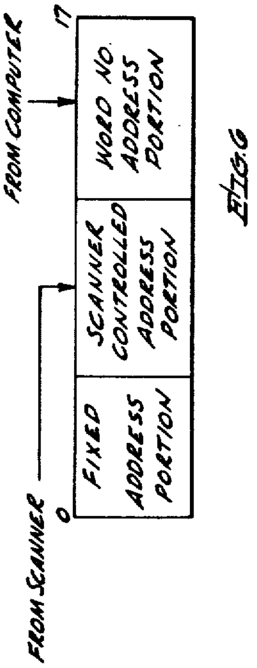
FIGURE 6 is a format of an address word generated in a memory address generator shown in FIGURE 1.

The data line scanner 26 may include a data ready flip flop for each input line and a Gray code counter having an input term coupled to each data input flip flop. Only when the data input flip flop is set does the counter stop and transfer an address to the memory address generator 28 either directly or through a decoder (FIG. 6). The memory address from the Gray code counter in combination with a base address in the register is utilized by the address register 36. The register in the generator 28 may be of any suitable type such as shown on page 141 of "Modern Digital Circuits" by Samuel Weber, 1964, published by McGraw-Hill Book Company. The Gray code counter may be of any well known type such as taught in an article, "Forward Backward Gray Code Counter," G. D. Beinhocker in Control Engineering, February 1960. The count is controlled by a single bit in accordance with the Gray code and the data ready flip flops provide that single control bit. For output data control the scanner 26 may include a flip flop for each output line similar to the data ready flip flop of FIG. 7 and responding to an output data signal. A portion of the states of the Gray counter described for the input data portion may be utilized for output scanning and supplying an appropriate address to the address generator 28.

Figures 9, 10:
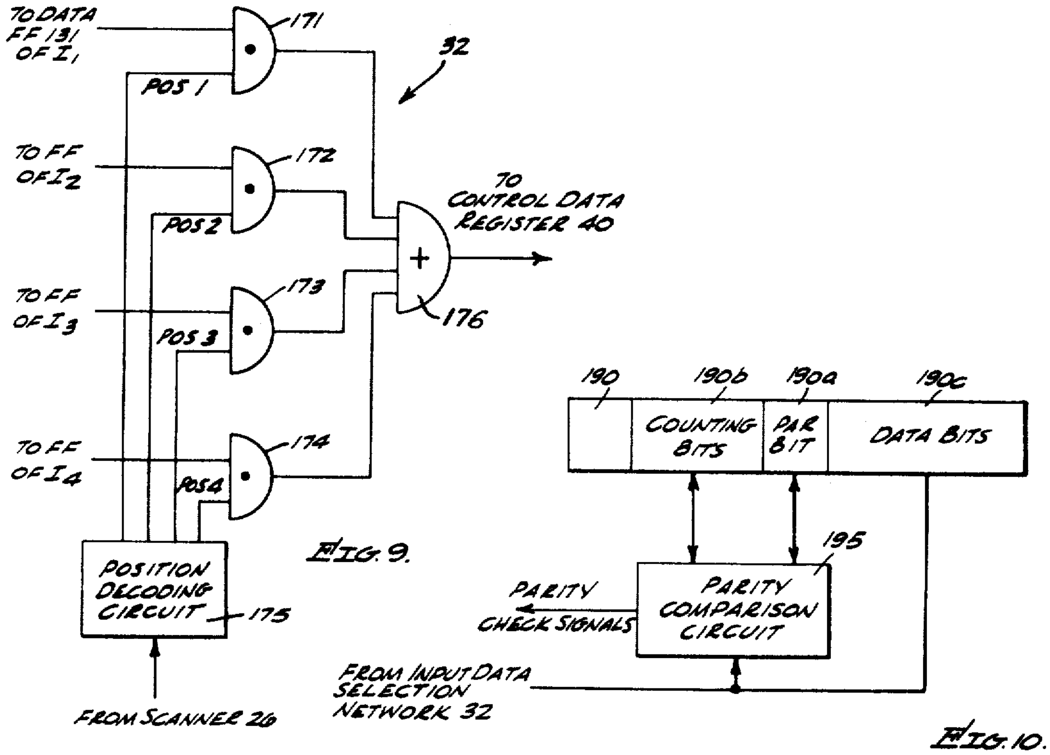
FIGURE 9 is a block diagram of an input data selection network shown in FIGURE 1.
FIGURE 10 is a partial block diagram of the control data register 40, incorporated in another embodiment of the present invention.

The input data selection network 32 may be of the type to be described relative to FIG. 9 and the output data selection network may be similar to that of FIG. 9 except that the data bit is transferred from the control data register 40 to the output data line. The control data register 40 may be of the type shown in FIG. 5, receiving bit position and transfer mode (input or output) data from the scanner 26.

In operation, scanner 26 scans all the data lines coupled thereto to sense which of the lines requires service. When any of the input data lines $I_1$ through $I_4$ has data to be supplied to the computer, or any of the output data lines $O_1$ through $O_4$ requires data from the computer, it provides a data signal which, when sensed by a scanner, causes the scanner to stop at such line. For example, assuming that line $I_3$ has data to be supplied to the computer, then when the scanner reaches position number 3, the scanner stops, supplying signals indicating its stopped position to networks 32 and 34, as well as to memory address generator 28. Generator 28, upon receiving the signal from scanner 26 indicating that the scanner stopped at position number 3, will energize address register 36 to supply a word from memory, located in a particular address associated with input data line $I_3$, to data register 38 and therefrom to control data register 40.

At substantially the same time, input data selection network 32, receiving any data on any of the input lines as well as the signal from scanner 26 indicating that the scanner has stopped at position number 3, will cause only the data on input data line $I_3$ to be transferred therethrough to the control register 40. The latter register is controlled by a control unit to be described hereafter in detail which, when supplied with signals indicating that the scanner has stopped at any of the positions associated with any of the input data lines, will cause control data register 40 to receive the data from network 32 and insert it into the content of the buffer control register 40, previously supplied thereto from the memory 20C through the data register 38. The next contents are restored to the same memory location from where the data was extracted.

Thus, the data from line $I_3$ passing through input data selection network 32 is written into the memory word from control register 40 via the data register 38. The particular location in the control register where the data is written is controlled by a bit counter which forms a part of the control register word. The count in the counter is modified each time data is stored in its word. The initial condition of the counter is under computer control to control the length of a message word storable in the memory. When the word is filled, a signal is supplied to the computer so that a next word length control associated with $I_1$ is prepared to be transferred to buffer control register 40 in the form of counter initial conditions when the next byte from $I_1$ is received, thereby effecting automatic message unpacking.

On the other hand, when any of the output data lines $O_1$ through $O_4$ requires service, as determined by the scanner, the scanner stops at a position corresponding to the output data line to be serviced. For example, if data line $O_2$ requires data from the memory 20C of computer 20, it provides an output data signal which when sensed by the scanner 26, causes the scanner to stop at position number 6. The stopping of the scanner 26 at position 6 energizes generator 28 to supply address register 36 with an address associated with data stored in memory 20C to be supplied to output data line $O_2$. It is to be noted that the Gray counter as previously described is selected with sufficient count states to scan both the input and the output data lines. Such data is then transferred to data register 38 and therefrom to control register 40. At the same time the buffer control register 40 is energized by the control unit to be described hereafter in detail, indicating that the scanner stopped. Consequently, buffer control register 40 is controlled to transfer the data supplied thereto from data register 38 to the output data selection network 34. The latter network is supplied with a signal indicating that the scanner stopped at position number 6, and therefore is energized to transfer the data supplied thereto from control resister 40 to the output line $O_2$ associated with position 6 of scanner 26. Thus, the data previously stored in memory 20C is transferred through data register 38 and control register 40 to the network 34 and therethrough to the output data line $O_2$.

The time required for the entire operation of sensing that any of the lines requires service, stopping the scanner, locating the address of the word associated with the particular line, transferring the data located thereat to the control register, and transferring thereto the data if the line to be serviced is an input data line or transferring the data therefrom to an output line if the line requiring service is an output data line, and thereafter retransferring the word into memory, is only a fraction of the time or period during which a bit of data is supplied by any of the output data lines. Therefore, the computer is capable of scanning each of the lines and servicing it during a time period which is usually shorter than and in the extreme cases never greater than the period at which data is supplied or to be received from the computer.

For example, if data is serially supplied to the computer, with any bit of information being supplied during a minimum bit period $P_B$, the computer is operated at a rate high enough so that during a period $P_B$ each of any N lines, whether input or output, can be serviced. Thus, none of the data which is supplied to the computer by any of the input data lines can be lost or destroyed before the computer transfers it to its appropriate location in memory.

Figure 2:
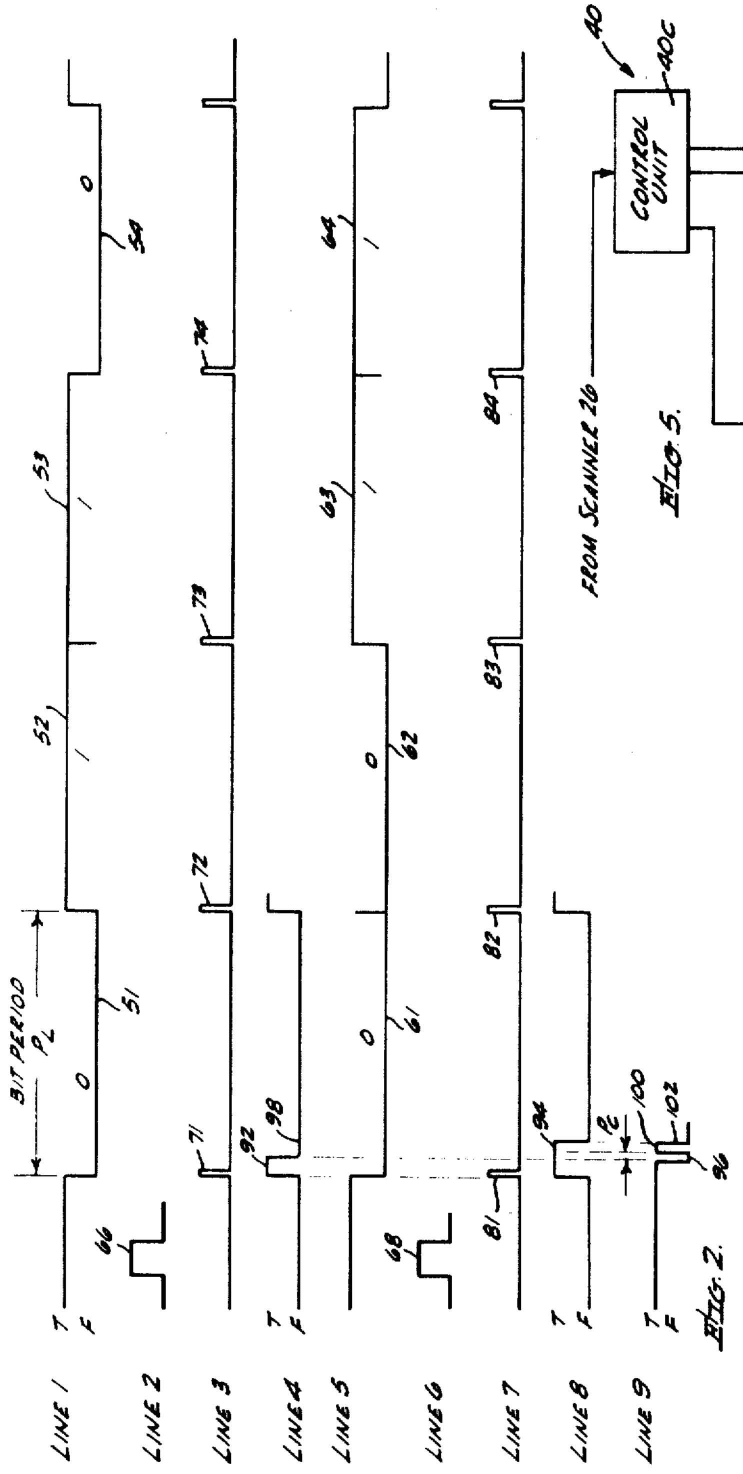
FIGURE 2 is a diagram of waveforms useful in explaining the use of data signals for controlling the computer associated with the data transferring buffer.

Attention is now directed to FIGURE 2 which is a waveform diagram useful in explaining the novel teachings of the present invention. Lines 1 through 4 are assumed to represent signals provided by one of the input lines such as line $I_1$ and produced in its input circuit 29, while lines 5 through 8 represent signals produced by another of the input data lines such as $I_2$ and its respective input circuit 29. Line 9 is useful in explaining the operation of the data line scanner 26. In each of the lines in FIGURE 2 the upper level is defined as a true state while the lower one is defined as a false state as indicated by letters T and F, shown on the lefthand side of line 1. The inverse definitions are also applicable provided the inverse logical operations are performed.

For explanatory purposes, let it be assumed that data is supplied by any of the input data lines serially bit by bit. Line 1 of FIGURE 2 represents data bits of 0110 as indicated by lines 51 through 54 respectively. Similarly, let it be assumed that input data line $I_2$ supplies data bits 0011 as designated in line 5 of FIGURE 2 by reference numerals 61 through 64. Whenever any of the input data lines provides data to the computer, it also provides an input data signal. The input data signals associated with input data lines $I_1$ and $I_2$ are designated in lines 2 and 6 respectively of FIGURE 2 by reference numerals 66 and 68. In one specific embodiment of the invention, the input data signal 66 causes a source of timing pulses in an input circuit to produce a pulse in response to each of the data bits supplied by its respective line. These timing pulses shown in line 3 of FIGURE 2 as being generated at the beginning of each of the bits are designated by numerals 71 through 74 respectively. Similarly, the input data signal 68 associated with input data line $I_2$ causes the generation of a plurality of timing pulses 81 through 84 which are generated in response to the data bits supplied by input data line $I_1$, which are diagrammed in line 5 of FIGURE 2.

In the same specific embodiment, in response to the timing pulses generated in the input circuit, a flip-flop which will be diagrammed hereafter in detail, is set to a true level. The setting of the flip-flop associated with the input circuit of input data line $I_1$ is diagrammed on line 4 of FIGURE 2 by line 92 shown to be in the true level in response to timing pulse 71. Similarly, the setting to a true level of the flip-flop associated with input data line $I_2$ is diagrammed in line 8 of FIGURE 2 by the true level, designated by reference numeral 94 which occurs in response to the timing pulse 81 generated therein.

The data line scanner 26 (FIGURE 1) scans these various flip-flops and senses which are set to a true level. Upon detecting a flip-flop so set, the scanner stops to transfer the data from the line associated with such a flip-flop to the control register 40 (FIGURE 1). For example, let us assume that the data line scanner 26 in sequentially scanning the various input and output data lines scans data line $I_1$. Upon sensing that the flip-flop associated therewith is set to a true level as indicated by reference numeral 92, a flip-flop within the scanner is reset to a false level as indicated by reference numeral 96 in line 9 of FIGURE 2. The setting to a false level of this flip-flop also causes the resetting of the flip-flop associated with line $I_1$ to a false level as indicated by reference numeral 98 in line 4 of FIGURE 2. When the scanner is set to a false level (numeral 96), the scanner stops from scanning succeeding data lines. The position at which the scanner 26 stops, which when associated with line $I_1$ is in position number 1 (one) is supplied to the memory address generator 28. The function of the memory address generator as will be described hereafter, is to sense the position at which the scanner 26 stops and energize the address register 36 in accordance therewith so that a memory word associated with the input data line $I_1$ may be transferred from the memory 20C to the control register 40 through the data register 38 of the computer 20.

Although in the foregoing, a specific embodiment has been described for generating signals to be sensed by the scanner 26, it should be appreciated that different arrangements may be employed to produce signals which when sensed by the scanner 26 cause it to stop at an appropriate position. Also it should be appreciated that even though, in FIGURE 2, the input data signals 66 and 68 from lines $I_1$ and $I_2$ are synchronized, data may be supplied to the computer asynchronously, since the sensing of the presence of input data signals by the scanner is not dependent on the signals being synchronized.

Figure 3:
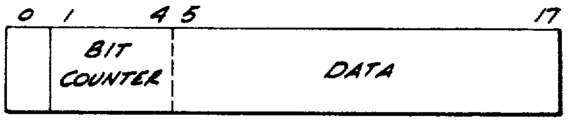
FIGURE 3 is a format of a memory word between which data is transferred through the buffer of the present invention.

Each of the memory words stored in memory 20C may have a format as diagrammed in FIGURE 3 to which reference is made herein. In the specific application, each memory word is assumed to be of eighteen bits, with the first bit (zero bit) being used for coding purposes while the fourteen bits from the fifth through the seventeenth bit are used for storing data. Bits 1 through 4 are used as counting bits, comprising the counter, the function of which is to control or monitor into which of the data bits, data is transferred therein, as well as control or monitor the data bits out of which data is read out and to determine when a word has been transferred. Thus, the count in the counting bits indicates the bits of the data word which have still to be transferred. It may be thought of as a byte address in the particular memory word.

The memory address generator 28, upon sensing that the data line scanner 26 stopped at position number one, thereby indicating that an input data signal was present on the input data line $I_1$, generates an address signal and the appropriate memory data transfer signals to transfer a memory word associated with input data line $I_1$ to the buffer control register 40. Simultaneously therewith, the input data selection network 32 is energized by a signal from the scanner 26 indicating that the scanner stopped at position number one. The function of the network 32 is to select which of the data is transferred from the various input data lines to the buffer control register 40. Upon sensing that the scanner 26 stopped at position one, a bit of the data supplied by input data line $I_1$, such as the bit "one" designated by numeral 51 in line 1 of FIGURE 2, is transferred to the buffer control register.

The fact that the scanner 26 stopped, is supplied to a control unit of register 40. The function of the latter unit is to modify the count in the counting bits, when data from network 32 is received and stored in the memory word previously transferred thereto from the memory 20C, when the scanner 26 stopped on an input data line. It also modifies the count in the counting bits when data is read out of the word stored therein and transferred to the output data selection network 34 when the scanner 26 stops at any of positions 5 through 8, indicating that it stopped on an output data line.

The bit counter is also controlled by the computer program. It can be set to any desired count which represents the word length, so that a specific number of bits is assembled into a word which is then stored in the memory. The bit counter provides the computer with a signal, indicating word assembly completion, which in turn causes the computer to prepare a subsequent initial count associated with the particular data line to be transferred to the buffer control register 40 when a subsequent byte is received from said data line. Thus message unpacking is automatically accomplished by this means and computer programming.

Upon completing the transfer of the data into the memory word in the control data register 40, the computer causes the memory word in the control register 40, in which the data from input data lines $I_1$ has been transferred to or written into, to be restored in its respective address in the memory 20C. After the memory word is restored in its location or address, a signal is supplied by the computer to the scanner 26 setting it back to a true level as indicated by reference numeral 100 in line 9 of FIGURE 2 to resume the scanning operation. When scanning line $I_2$ and detecting that its respective flip-flop is set to a true level as indicated by numeral 94 in line 8 of FIGURE 2, the scanner is again reset to a false level as indicated by numeral 102. As a result, the scanner supplies the appropriate signal to the computer and to the input data selection network 32 so that the "zero" bit represented in line 5 of FIGURE 2 by reference numeral 61, which is the first data bit supplied by the input data line $I_2$, may be transferred to a memory word associated therewith which the computer transferred to control register 40 in a manner similar to that hereinbefore described.

Figure 4:
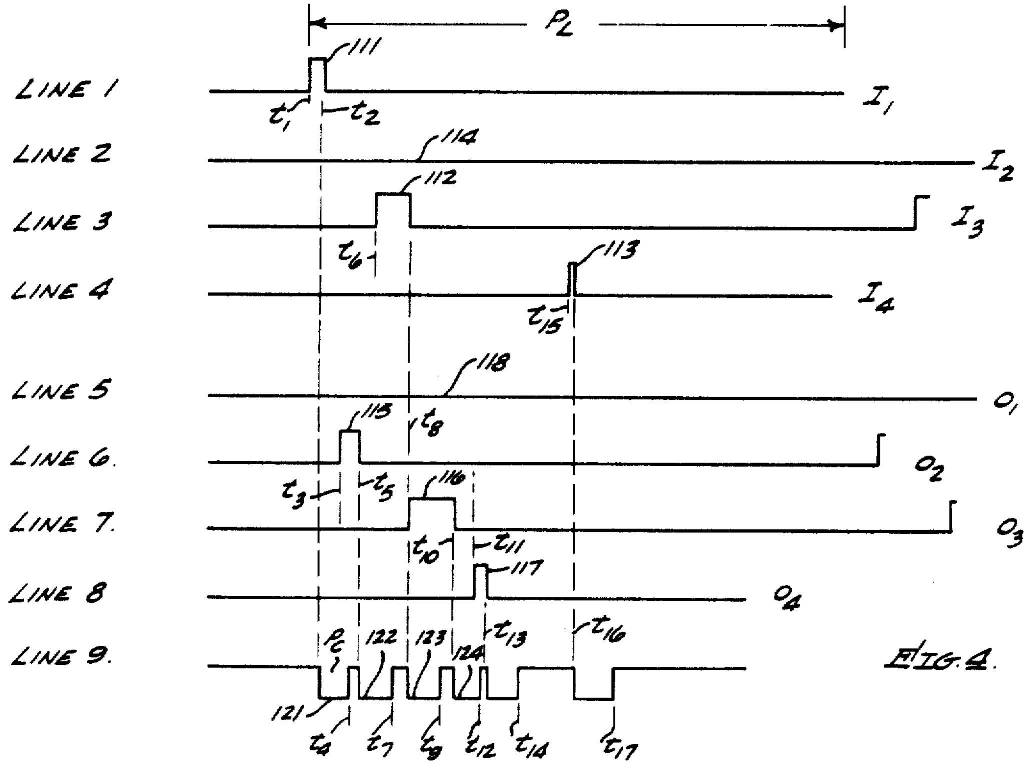
FIGURE 4 is a diagram of waveforms similar to the diagram in FIGURE 2.

The mode of operation of the novel buffer of the present invention may further be explained in conjunction with FIGURE 4 to which reference is made herein. Therein pulses or signals 111, 112 and 113 represent input data signals provided by input data lines $I_1$, $I_3$ and $I_4$ respectively. Each pulse or signal indicates that its respective input data line has data to be transferred to the computer. The absence of a signal on straight line 114 indicates the absence of data on input data line $I_2$. In FIGURE 4, pulses 115, 116 and 117 represent output data signals provided by output data lines $O_2$, $O_3$ and $O_4$ respectively, while the absence of a pulse on straight line 118 indicates that line $O_1$ is not to receive any data from the computer.

The first data signal to be sensed by scanner 26 (FIGURE 1) at time $t_2$ is input data signal 111 which causes the scanner to stop as indicated by line 121. Between time $t_2$ and $t_4$, the buffer, together with the computer 20, transfers a bit of data from the input data line $I_1$ to a memory word associated with $I_1$ as hereinbefore described in conjunction with FIGURE 2. At time $t_4$ the scanner resumes to scan subsequent lines until time $t_5$ when the next data signal 115 provided by output data line $O_2$ is sensed. At such time, the scanner is stopped at position 6 as indicated by line 122 and a bit of the data from a memory word associated with output data line $O_2$ is transferred from the control data register 40 through the output data selection network 34 to the output data line $O_2$. This operation is completed at time $t_7$ when the scanner resumes its scanning operation until time $t_8$ when input data signal 112 provided by input data line $I_3$ is sensed. The scanner is again stopped as indicated by line 123 and energizes the various circuits of the buffer and the computer to transfer the data bit from input data line $I_3$ to an appropriate memory word associated therewith. At the end of this operation, i.e., at time $t_9$, the scanning operation resumes until a subsequent output data signal 116 is sensed at time $t_{10}$. The computer stops once more as indicated by line 124 and transfers a bit of data to the output data line $O_3$. At time $t_{13}$ the scanner, upon sensing pulse 117 associated with the service requirement of output data line $O_4$, stops to transfer a bit thereto. The transfer occurs between times $t_{13}$ and $t_{14}$ when the scanning operation resumes until time $t_{16}$ when the input data signal 113 provided by input data line $I_4$ is sensed. The scanner stops once more and causes the data provided by input data line $I_4$ to be transferred to a memory word associated therewith during the time period between time $t_{16}$ and $t_{17}$, when the scanning operation resumes once more.

As should be apparent in light of the foregoing description, the buffer of the present invention together with the computer 20, are capable of transferring data from any one of the input data lines providing an input data signal as well as supplying data to any one of the output data lines associated with an output data signal, such as 115, 116 or 117. The time required for the complete transfer of the data from one of the input data lines to the computer, or the transfer of data from the computer to the output data line is only a fraction of the shortest bit period during which a data bit is supplied to or received from the computer. Thus, during such period, the buffer and the computer are capable of servicing each of the data lines, whether input or output, coupled thereto, and thereby prevent the loss of any of the data which any of the input data lines may be supplied or the loss of a bit of data which is to be supplied to any of the output data lines.

Upon sensing a data signal, whether input or output, the scanner stops and its position is used to perform three functions. One function is to transfer from memory to the control register 40 (FIGURE 1) a memory word associated with the particular data line associated with the data signal. The other function of the position of the scanner is to sense the source of the data signal, so that data is written into the word in register 40 when the data signal is an input data signal, and data is read out therefrom in response to an output data signal. The third function which the scanner performs is to control selection networks 32 and 34 (FIGURE 1) so that only the data from the particular line providing the data signal is either supplied to the control register to be stored in the memory word therein or transferred from such control register to the appropriate output data line.

Figure 5:
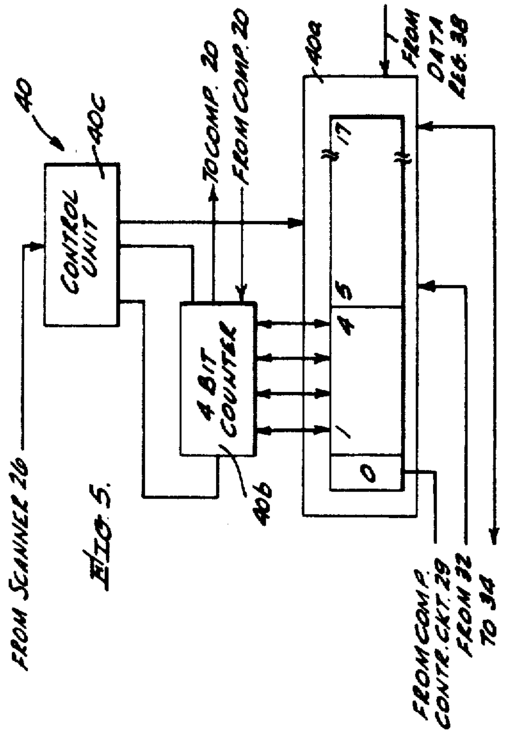
FIGURE 5 is a block diagram of a buffer control register, shown in FIGURE 1.

Attention is now directed to FIGURE 5 which is a block diagram of the buffer control register 40 (FIGURE 1). It comprises a register 40*a* into which a memory word of the format shown in FIGURE 3 may be transferred from memory 20C (FIGURE 1). Bits 1 through 4 which as herebefore described in conjunction with FIGURE 3 are the counting bits are connected to a four-bit counter 40*b*, so that when a word is transferred into register 40*a*, the bits 1 through 4 set counter 40*b*. Counter 40*b* is in turn connected to a register control unit 40*c* which responds to signals from the scanner 26 indicating whether the scanner stopped at a position related to an input data line or an output line to transfer data from network 32 to register 40*a* or remove data therefrom. Register control unit 40*c* upon transferring data to or from register 40*a* augments the count in counter 40*b* which transfers the augmented count to bits 1 through 4 prior to the transfer of the word to memory.

The count in the counting bits of any memory word may be initially set to any given value by the computer 20 so that after it is augmented by a number corresponding to a desired word length to be stored in the particular memory word, a signal is supplied from counter 40*b* to the computer 20 indicating that the memory word is filled so that a new memory word may be prepared to receive a subsequent data word from the same input data line. For example, assuming that a three-bit byte is to be stored in a given memory word, the count in its counting bits may be set to 14 so that when the first and second bits are stored, the count is increased to 15 and 16, respectively. Then when the last bit of the three-bit byte is stored, the counter 40*b* is reset supplying a signal to the computer to indicate that the particular word is filled. Thus automatic message unpacking is accomplished by programming the computer to initially set the count in the counting bits of the various words in accordance with the lengths of the data word to be stored in memory registers. Similarly, message packing may be automatically accomplished by initially setting the count in words from which bytes are to be read out so that when a complete word is read out from a memory word, a signal from counter 40*b* is supplied to the computer indicating the completion of the word transfer and the need of preparing another word for transfer to the register 40*a* during a subsequent readout operation.

As seen from FIGURE 5, the zero bit in register 40*a* is connected to the computer control circuit 29 of computer 20. This bit may be used as part of the data bits or for any desired coding purpose. For example in one specific embodiment, it was used for coding the last word in a memory associated with a given data line so that after such word is filled, a signal is supplied to the computer indicating that additional data from that particular line cannot be accepted since all the memory words associated with such line are filled. It should be appreciated however that it may be utilized for any other coding function.

As herebefore described, the function of the memory address generator 28 (FIGURE 1) is to produce the address of a memory word associated with each one of the lines which is to be transferred to buffer control register 40 so that data may be introduced therein or extracted therefrom.

Referring to FIGURE 6, there is shown a specific format of a word storable in generator 28 which may comprise a conventional register. A first portion designated scanner-controlled address portion is controlled by the scanner 26 to provide an address signal as a function of the scanner's stopped position. For example, if the scanner stops at a position related to input line $I_4$, the signal stored in the first address portion represents the address associated with all the words in memory related to line $I_4$. The second address portion designated word-number address portion is controlled by the computer which is assumed to monitor the number of words associated with each line, into which bytes have already been transferred or read out from, so that the proper word associated with each line is supplied to the buffer control register 40. For example let us assume that the first two words associated with a line such as line $I_2$ have already been filled with bytes and that scanner 26 stops again at a position related to line $I_2$. Counter 20 having monitored that the first two words associated with line $I_2$ have been filled will provide an address signal for the word-number address portion corresponding to the address of the third word of line $I_2$ so that the data therefrom is stored in the proper sequence. The word in register 28 may include a third portion designated as the fixed address portion into which defines the portion of the memory wherein are located only words associated with the various data lines.

It should be appreciated that the foregoing description of generating the address of one of a plurality of words associated with a particular line is but one example of providing the desired address. Different computer techniques may be employed to sense the scanner's position with respect to a particular data line as well as monitor the words associated with the particular line which have already been operated upon in order to transfer the proper word to the buffer control register, so that data may be transferred between the particular line and the word in the buffer control register.

Figure 7:
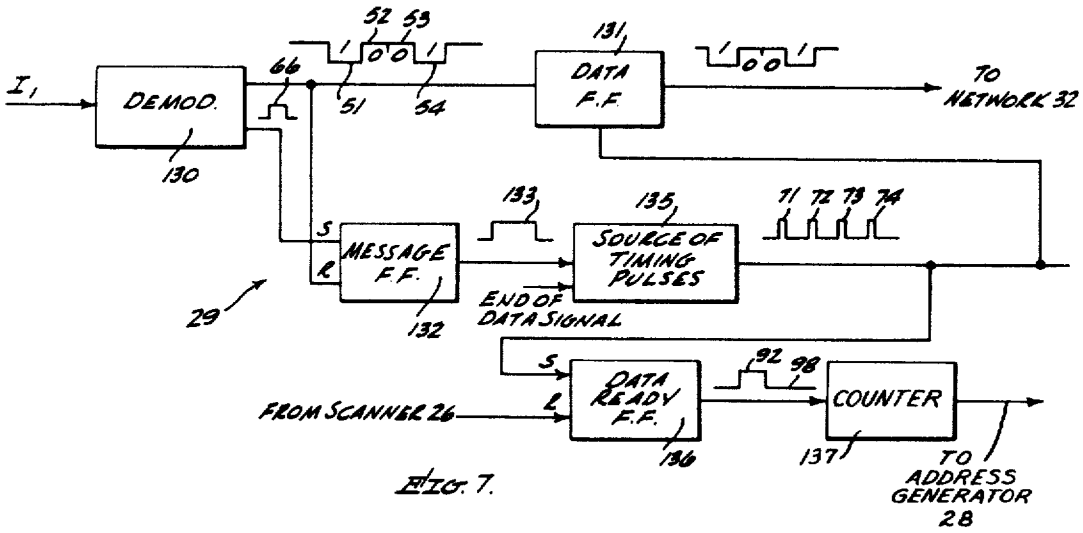
FIGURE 7 is a block diagram of one example of a circuit for providing an input data signal and data from an input data line.

As previously explained in conjunction with FIGURE 2, one technique of transferring data from an input data line, such as $I_1$, to the computer is to generate an input data signal such as 66 (line 2, FIGURE 2) which in turn provides a sequence of timing pulses 71 through 74 (line 3, FIGURE 2) each being used to stop the scanner 26 so that a data bit related thereto may be transferred to the computer. For explanatory purposes, one specific example, used to generate such signals, is diagrammed in FIGURE 7, it being appreciated that other techniques with different arrangements may be utilized in practicing the teachings of the invention. In the specific data link arrangement, the signals supplied by input data line $I_1$ are in the form of frequencies where a first frequency represents a binary one, a second frequency a binary zero, and a third frequency the input data signal 66 (line 2 of FIGURE 2), each input data line may include an input circuit 29 which as shown in FIGURE 7 includes a demodulator 130. The demodulator which is energized by the various frequencies supplied by input data line $I_1$, demodulates or separates the various frequencies, supplying the data bits, i.e., the binary zeroes such as 51 and 54 and the binary ones 52 and 53 to a data flip-flop 131, while the input data signal 66 is provided to a set (S) terminal of a message flip-flop 132. The reset (R) terminal of flip-flop 132 is also connected to the data output of the demodulator 130. When the input data signal 66 is generated, the flip-flop 132 is set to a true level as indicated by its output pulse or signal 133. The output of flip-flop 132 remains true until the first data bit such as that designated by reference numeral 51 is sensed, at which time the signal 133 is set to a false level. When being reset to a false level, the signal triggers a source of timing pulses 135 which provides the timing pulses 71 through 74 one pulse per bit. The period between pulses is equal to the bit period of the data bits supplied to the data flip-flop 131. The function of the timing pulses the output of the source 135 is connected to a control terminal (C) of the data flip-flop 131 to control it to provide the ones and zeroes to the input data selection network 32. The first timing pulse 71 is also used to set a data ready flip-flop 136 to a true value as indicated by reference numeral 92. The reset (R) terminal of data ready flip-flop 136 is connected to the scanner 26 so that when scanner 26 is at position number one (1) associated with input data line $I_1$, and the data ready flip-flop 136 of the input circuit 29 of line $I_1$ is true (numeral 92), the scanner stops at such position, as well as resets the data ready flip-flop 136 switching its outputs to a false level as indicated by numeral 98. The data ready flip-flop may be reset by a signal derived for the computer control circuit 29 when the transfer is complete.

As herebefore described in conjunction with FIGURE 2, when the scanner stops at a given position such as position one (1) related to input data line $I_1$, a flip-flop therein is switched from a true level to a false level as designated by numeral 96 in line 9 of FIGURE 2. The scanner's flip-flop remains at a false level during the word transfer operation $P_C$ during which a word is transferred to the control data register, data introduced or removed therefrom, and the word retransferred back into memory. The data ready flip-flop 136 controls a counter 137 so that the count stops only when the signal 92 is present. Shortly thereafter an address portion (FIG. 6) is transferred to the address generator 28.

Figure 8:
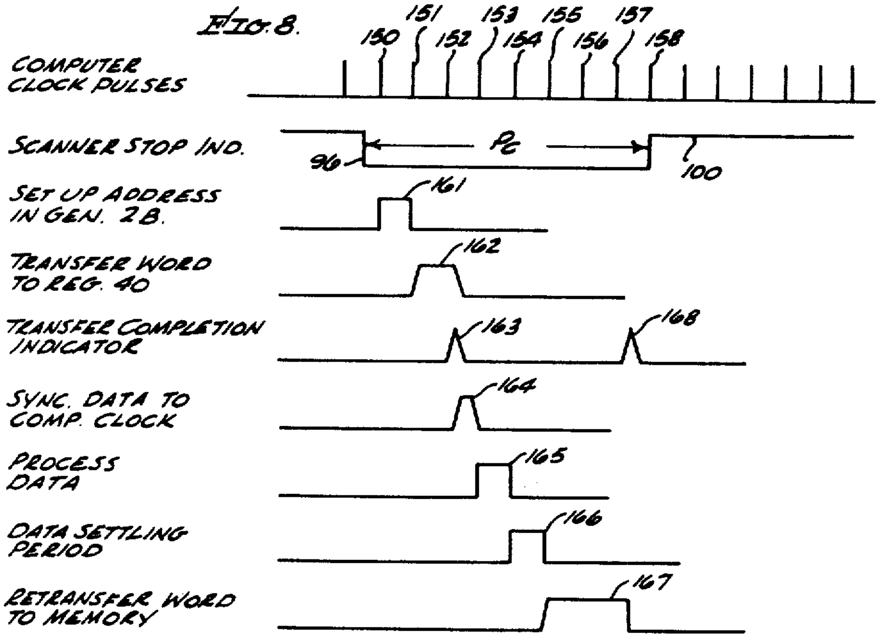
FIGURE 8 is a diagram of waveforms useful in explaining the sequence of operations in transferring data between any of the data lines coupled to the novel computer controlled data transfer buffer of the present invention and a memory word.

One sequence of operations or steps in occurring during the period $P_C$ when data is transferred between the memory and the control register 40, may be explained in conjunction with FIGURE 8 to which reference is made herein. For the description of FIGURE 8, it is assumed that a synchronous operation is performed and that other timing and sequence-controlling signals well known in the computer are generated. It should be apparent from the following description that the teachings of the invention are not limited to synchronous operation and that they may be practiced in conjunction with any asynchronous computer as long as the following time relationship, that is $P_C \times N \leq P_L$, is not violated. Line 1 in FIGURE 8 represents clock pulses conventionally produced in a computer by a computer clock (not shown) for controlling a sequence of operations.

Upon setting the scanner's flip-flop to a false level indicated in line 2 of FIGURE 8 by numeral 96, the next succeeding clock pulse 150 causes the setting of the address in address generator 28 as indicated by signal 161. The setting requires one clock period so that when a succeeding clock pulse 151 is generated, the word from memory is transferred to the control data register 40, as indicated by signal 162. After the word is in the register 40, a transfer completion signal 163 is generated and thereafter the data is synchronized with the computer's clock by signal 164, so that during the clock period between clock pulses 153 and 154, the data is processed. That is, data is either transferred to the memory word or read out therefrom. The processing of the data is diagrammed in FIGURE 8 by signal 165. During the succeeding clock period between clock pulses 154 and 155 as indicated by signal 166, the data in the register may be permitted to settle and reach a quiescent state, so that when clock pulse 155 is generated the data is in condition to be retransferred to the memory 20C (FIGURE 1) from register 40 as indicated by signal 167. The period defined by signals 165 and 166 may be thought of as the data processing period during which data is either transferred to the memory word in buffer control register 40 or read out therefrom.

The retransfer may require more than one clock period. After the word is retransferred to memory, a transfer completion signal 168 is generated so that when the succeeding clock pulse 158 is produced the scanner's flip-flop is set to a true level 100, thereby enabling the scanner to scan succeeding lines coupled thereto. It should be appreciated that controlling the sequence of operations as herebefore described is within the state of the computer art with known computer circuits and therefore a detailed description of such circuits is not included herein.

Attention is now directed to FIGURE 9 which is a block diagram of one embodiment of the input data selection network 32 (FIGURE 1), the function of which is to control the transfer of data to the control data register 40 from the line at which the scanner 26 stops. The network 32 is shown comprising And gates 171 through 174 connected to flip-flops 131 of input circuits 29 associated with input data lines $I_1$ through $I_4$ respectively. The other input of each of the gates is connected to another output of a position decoding circuit 175 which decodes the position at which the scanner 26 stops. As a result, And gate 171 is enabled when scanner 26 stops at position 1 while gates 172, 173, and 174 are enabled when scanner 26 stops at positions 2, 3, and 4 respectively. The outputs of the And gates are "ORed" through an Or gate 176, the output of which is connected to the bit #5 of register 40*a* (FIGURE 5) of control data register 40 so that at any given time only a data bit from the input data line at which the scanner stops is transferred to the memory word in register 40. An inverse arrangement may be employed for the output data selection network 34 to insure that output data is only transferred to one of the output data lines as determined by the relative position at which the scanner 26 stops.

Herebefore, aspects of the teachings of the invention have been described in conjunction with controlling the transfer of data between any of the data lines and the memory word in the buffer control register 40. As herebefore described, the control is accomplished by means of the counting bits included in each word (see FIGURES 3 and 5) which together with the counter 40*b* whose initial state is under computer control. By setting the counter to a given state and augmenting the count therein each time data is transferred to or from the word, the byte length storable or readable from the word is controlled and automatic message unpacking accomplished.

This basic principle may be employed in providing automatic parity checking by including in each memory word a parity bit which is settable in either of two binary states depending on the odd or even number of ones or zeroes in the word. For example, as seen in FIGURE 10, which is a partial block diagram of the buffer control register 40 of another embodiment of the invention, a memory word 190 transferred thereto may include a parity bit 190*a* and a group of counting bits 190*b* which are shown connected to a parity comparison circuit 195. Circuit 195 in response to each bit of data from input data selection network 32 which is stored in the data bits portion 190*c* of word 190, augments the count in bits 190*b*. It also monitors the even or odd number of either the binary "ones" or binary "zeroes" in bits in accordance therewith. Then after a selected number of bits have been stored in bits 190*c*, a succeeding bit is compared with the state of parity bit 190*a* to provide an automatic parity signal.

For example, let us assume that after N data bits, a parity bit is supplied by each input line such as I, and that parity bit 190*a* is set to a 1 when the number of ones in bits 190*c* is odd and a zero when the number of ones is even. Then in accordance with the invention when the count in bits 190*b* is N, the next bit from the input line which is a parity bit is compared with the setting or binary value of bit 190*a*. A parity check signal is provided by the circuit 195 when the two are in agreement, thereby indicating that the data in bits 190*c* are correct and that no data errors occurred during the data transmission or data transfer operations. It should be appreciated that in some applications, it may be desirable to include in the buffer control register 40 only the circuitry, such as shown in FIGURE 5, for controlling the transfer of data from or to the memory word as a function of the count in the counting bits 1 through 4. On the other hand, in other arrangements, it may be desired to provide only the parity checking circuitry hereabove described or combine both arrangements so that both data unpacking and parity checking, which can be thought of as an arrangement for indicating the characteristics of the data in the word, are provided.

There has accordingly been shown and described herein, a novel data transfer buffer for coupling a plurality of data lines to be serviced with a computer in which are stored memory words associated with each of the lines. In light of the foregoing, it should be appreciated that in the buffer of the present invention, a single input output channel is used to service all the lines. The operation of the buffer may be summarized as scanning the lines to sense which of them requires service. Upon sensing that a line is to be serviced, the buffer's scanner stops at a position related to the line. The position is decoded to generate an address related to a memory word associated with the particular line and transferring the word to a control data register in which the data is processed. If the line is an input data line, data therefrom is transferred to the word in the control data register while data is received therefrom if the line is an output data line. After processing the data, the word is returned to the computer's memory and the scanner enabled to scan succeeding lines until stopped by a subsequent line to be serviced.

It is appreciated that those familiar with the art may make modifications or substitute equivalents in the arrangements herebefore described to explain the teachings of the invention. Therefore, all such modifications and/or equivalents are deemed to fall within the scope of the invention as claimed in the appended claims.

What is claimed is:

1. In a computer system including a computer and a memory wherein memory words are stored in memory addresses, said computer being couplable to sets of data lines each set comprising at least one line for transferring data therebetween and said memory, the data formed of bits having a minimum bit period, an improved computer-controlled buffer for linking said computer and said memory to said sets of lines comprising:

first means for sequentially scanning the set of lines during each minimum bit period to transfer data therebetween and said memory;

a buffer control register for receiving a memory word from said memory;

address generating means responsive to said first means for transferring a memory word from said memory to said buffer control register, said word being related to the set of lines scanned by said first means; and means for transferring data between said set of lines and said memory word in said buffer control register, said buffer control register including means responsive to data stored in said memory word for controlling the transfer of data thereto or for indicating the characteristics thereof.

2. The computer-controlled buffer of claim 1 wherein said memory word includes a plurality of bits for storing a count representative of the address of data stored in said word, said buffer control register including a bit counter responsive to the count in said plurality of bits for controlling the transfer of data between said memory word and said set of lines.

3. The computer-controlled buffer of claim 1 wherein said memory word includes a parity bit and said buffer control register includes parity comparison means for comparing the said parity bit with a preselected bit transferred to said word and providing a parity check signal as a function of the comparison therebetween.

4. A computer-controlled buffer for coupling a computer having a memory unit with data stored therein in memory address to a plurality of sets of input data lines providing said computer with data to be stored therein or a set of output data lines for receiving data from said computer, said buffer, the data on said data lines represented by bits each of a duration at least equal to a minimum bit period comprising:

scanning means for scanning each of said plurality of sets of data lines during said minimum bit period to sense a service request signal therefrom;

a control register;

means responsive to a service request signal of one of said sets for transferring from said memory unit a memory word located in a memory address associated with said set to said control register; and means for operating on said memory word as a function of whether said set is an input set of data lines whereby data from said set is transferred to said memory word in said control register and when said set is a set of output data lines, data from said memory word is transferred to said line, said control register further including means for controlling counting means associated with each of said computer words as data is transferred between said memory word and one of said sets of lines, said counting means providing an address in said word of the data therein.

5. The computer-controlled buffer defined in claim 4 wherein each of said words includes a parity bit settable in either of two binary states as a function of the parity characteristics of the data in said word, said buffer further including means for comparing said parity bit with a parity signal provided by said one set of lines.

6. A buffer for intercoupling a computer and a plurality of sets of input data lines to each adapted to supply data for storage in a memory in memory words located in memory addresses associated with each of said sets, the buffer comprising:

scanning means for sequentially scanning said plurality of sets of input data lines arranged in a sequence to sense which of said sets has data to be supplied to said memory, each set including one or more data lines;

first means for generating an address signal in response to the relative position of a set of input data lines in said sequence which has data to be supplied to said memory, said computer including a data register and means responsive to said address signal for transferring a memory word associated with said set from its respective memory address in said memory to said data register;

a control register for storing the memory word from said data register;

input data selection means for selectively transferring said data from said line to said control register for storage in said memory word, said memory word including augmentable counting means for controlling the location in said word wherein said data is stored; and computer control means for transferring back said memory word with the data stored therein to its respective memory address, said computer control means further energizing said scanning means to scan a succeeding set of lines in said sequence.

7. In a computer system wherein a computer is in data communication with a pluarlity of sets of data lines, each set comprising one or more lines and adapted to either transfer data to said computer to be stored in memory words of a memory, each word being located at a specific memory address of said memory or receive data in one of said memory words, the improvement comprising:

means for sequentially scanning each of the sets of data lines arranged in a sequence to sense a service request signal therein indicating whether said set contains data to be transferred to said memory or requests data therefrom;

memory address generating means associated with said computer responsive to the relative position of the set of data lines in said sequence with a service request signal for generating an address signal representative of a memory address in which one of the memory words associated with said set is located;

a control register adapted to receive a memory word from said computer;

means in said computer responsive to said address signal for transferring to said control register one of the memory words in a memory address associated with said set;

means for controlling the transfer of data to and from said memory word in said control register as a function of whether said set contains data to be transferred to said computer or is to receive data therefrom, each of said memory words including counting means, modifiable in said control register when data is transferred from said set to said memory word and modifiable when data is transferred from said word to said set; and means responsive to the transfer of data to and/or from said memory word in said control register for restoring said memory word in its respective memory address.

8. The buffer of claim 7 wherein said rate of sensing is at least equal to the fastest rate at which data is supplied to said computer times the number of sets of input data lines in said sequence.

9. The buffer of claim 7 for coupling a plurality of sets of output data lines to said computer each set being adapted to receive data from a memory word located in a memory address in said memory associated with said set of lines, said scanning means sequentially scanning said plurality of sets of input data lines and said plurality of sets of output data lines to sense which of said output data lines requests data from said memory:

said first means further generating an address signal in response to the relative position of a set of output data lines in said sequence which is to receive data from said memory; and output data selection means for selectively transferring the data from said memory word in said control register to said set of output data lines associated with said memory word, the counting means in said word being augmentable as data is transferred from said memory word.

10. The buffer defined in claim 7 wherein each of said words includes a parity bit settable in either of two binary states as a function of the parity characteristics of the data in said word, said buffer further including means for comparing said parity bit with a parity signal provided by said one set of lines.

11. In a computer system including a computer and a memory wherein memory words are stored in memory addresses, said computer being couplable to sets of input data lines to receive data from each of said sets for storage in words in said memory said computer being further couplable to sets of output data lines each adapted to receive data from said computer, an improved computer-controlled buffer for linking said computer to said sets of lines comprising:

scanning means for sequentially scanning each of said sets of lines arranged in a sequence to sense which of said input data line sets contains data to be transferred to said memory and which of said output data line sets is to receive data from said memory, said scanning means including means for stopping at a position related to the position within said sequence of the set which is to transfer data to said memory or receive data therefrom;

a control register adapted to receive a memory word from said memory;

means within said computer responsive to the position at which said scanning means is stopped for generating an address signal representative of a memory address of a memory word associated with the set of lines causing the stopping of said scanning means, said computer further including means responsive to said address signal for transferring the memory word stored in the memory address related thereto to said control register;

control means for transferring data from one of said sets of input data lines to said control register to said memory word when said scanning means stops at a position related to a set of input data lines and for transferring data from said memory word to a set of output data lines when said scanning means stops at a position related to said set of output data lines;

each of said memory words including augmentable counting means for controlling the transfer of data to said memory word and the transfer of data therefrom as a function of the count thereof; and means included in said computer for restoring the memory word in said control register in its respective memory address in said memory after the completion of the transfer of data to or from said memory word.

12. The buffer defined in claim 11 wherein said control means includes selection network means responsive to the position at which said scanning means stopped for transferring the data from said one input data line to said control register and for transferring the data from said memory word in said control register to one of said output data lines.

13. The buffer defined in claim 12 wherein said memory word further includes a parity bit indicative of the binary characteristics of the data in said memory word, and means for comparing said parity bit with a parity signal from the set of lines associated with said word.

References Cited

UNITED STATES PATENTS

| | | | |
|---|---|---|---|
| 3,312,945 | 4/1967 | Berezin et al. | 340—172.5 |
| 3,308,439 | 3/1967 | Tink et al. | 340—172.5 |
| 3,305,839 | 2/1967 | Looschen et al. | 340—172.5 |
| 3,303,476 | 2/1967 | Moyer et al. | 340—172.5 |
| 3,226,683 | 12/1965 | Gaffney | 340—172.5 |
| 3,229,259 | 1/1966 | Barker et al. | 340—172.5 |
| 3,202,972 | 8/1965 | Stafford et al. | 340—172.5 |
| 3,197,740 | 7/1965 | Terlato et al. | 340—172.5 |
| 3,133,268 | 5/1964 | Avakian et al. | 340—152 |
| 3,029,414 | 4/1962 | Schrimpf | 340—172.5 |
| 2,974,306 | 3/1961 | Femmer et al. | 340—172.5 |
| 2,946,044 | 7/1960 | Bolgiano et al. | 340—174 |
| 2,910,238 | 10/1959 | Miles et al. | 235—167 |

PAUL J. HENON, *Primary Examiner.*

GARETH D. SHAW, *Assistant Examiner.*